(12) United States Patent
Toda et al.

(10) Patent No.: US 7,104,697 B2
(45) Date of Patent: Sep. 12, 2006

(54) BEARING PART AND FABRICATION METHOD THEREFOR

(75) Inventors: Kazutoshi Toda, Tondabayashi (JP); Masao Goto, Habikino (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/696,134

(22) Filed: Oct. 29, 2003

(65) Prior Publication Data

US 2004/0091194 A1   May 13, 2004

(30) Foreign Application Priority Data

Oct. 30, 2002 (JP) .............................. 2002-316396

(51) Int. Cl.
*F16C 33/58* (2006.01)

(52) U.S. Cl. ..................... 384/569; 384/492; 384/571; 384/625; 29/898.066

(58) Field of Classification Search .............. 384/571, 384/492, 625, 569; 29/898.066
See application file for complete search history.

(56) References Cited

U.S. PATENT DOCUMENTS

| 3,714,694 | A | * | 2/1973 | Dobson ................. 29/898.066 |
| 4,191,599 | A | | 3/1980 | Stickels et al. |
| 4,871,268 | A | | 10/1989 | Furumura et al. |
| 5,009,523 | A | * | 4/1991 | Folger et al. ............... 384/475 |
| 5,658,082 | A | | 8/1997 | Tsushima et al. |

FOREIGN PATENT DOCUMENTS

| EP | 1 099 869 A2 | 5/2001 |
| JP | 06-198505 | 7/1994 |
| JP | 07-269574 | 10/1995 |

* cited by examiner

*Primary Examiner*—Lenard A. Footland
(74) *Attorney, Agent, or Firm*—Smith, Gambrell & Russell, LLP

(57) ABSTRACT

In a heat treatment wherein a blank (intermediate material) formed with a lubrication hole is heated and quenched, the quenching of the blank is terminated at the point of time that a temperature at a portion corresponding to a depth from a raceway surface (surface of a bearing part) of an outer ring (the bearing part), to which depth the maximum shear stress affects, is lowered to an MS point.

7 Claims, 2 Drawing Sheets

BEARING PART AND FABRICATION METHOD THEREFOR

FIELD OF THE INVENTION

The present invention relates to a bearing part such as an outer ring of a rolling bearing or more particularly to a bearing part having a hole portion such as a lubrication hole opening into a surface thereof, and to a fabrication method therefor.

DESCRIPTION OF THE PRIOR ART

As to a large size bearing assembled in a steel rolling mill (machine) or the like, there has been provided a bearing part, such as an outer ring which is, as required, formed with a hole portion opening into a surface thereof in order to maintain the performance of the bearing or to enhance the ability of handling thereof. In a double-row tapered roller bearing, for instance, an outer ring is provided with a lubrication hole intercommunicating inner and outer peripheral surfaces thereof for consecutively feeding lubrication oil to a raceway surface. Otherwise, the outer ring may be formed with a bolt hole in its outer peripheral surface such that during the assembly of the bearing into a machine, the bearing may be hung via a hanging bolt threadedly engaging the bolt hole.

In the conventional bearing part as described above, an intermediate material made from a bearing steel and formed into a predetermined shape is subjected to a heat treatment, and thereby reforming the raceway surface and the like. Thus, the bearing is increased in the flaking life at the raceway surface and thence is increased in the service life thereof.

However, in the case where the aforesaid hole portion is formed in the intermediate material before the heat treatment, the heat treatment may cause failure such as cracks in a peripheral area of the hole portion. On this account, the conventional bearing part and fabrication method therefor take an approach to form the hole portion after the heat treatment. However, the bearing part thus heat treated is hardened and hence, the formation of the hole portion requires an electro-discharge working, which notably increases the costs for the bearing part.

OBJECT AND SUMMARY OF THE INVENTION

In view of the foregoing, it is an object of the present invention to provide a bearing part and a fabrication method therefor which are adapted to obviate the failure such as cracks in a peripheral area of a hole portion, which may occur during a heat treatment, even though the hole portion such as a lubrication hole is formed before the heat treatment.

According to the present invention for achieving the above object, a bearing part having a hole portion opening into a surface thereof and hardened at least at the surface by a heat treatment, the bearing part is characterized in that the surface has a hardness of HRC60 or more and a residual compressive stress of 30 MPa or less.

The inventors have discovered that the bearing part thus arranged attains an ability to maintain the aforesaid surface hardness as well as to obviate the failure such as cracks in a peripheral area of the hole portion, which may occur during the heat treatment, when the residual compressive stress occurring at the surface is limited to 30 MPa or less. Furthermore, since the bearing part has the surface hardness of HRC60 or more, it is possible to achieve a required surface hardness as the bearing part.

A fabrication method for the above-mentioned bearing part comprises a heat treatment step following a drill work for drilling a steel intermediate material in order to form the hole portion opening into the surface thereof, and is characterized in that the intermediate material is heated to a predetermined temperature and then is quenched, and that the quenching is terminated at the point of time that a temperature at a portion corresponding to a depth from the surface of the bearing part, to which depth the maximum shear stress affects, is lowered to an MS point at which martensitic transformation starts and then, the intermediate material is air cooled.

According to the above fabrication method for the bearing part, the heat treatment for heating and then quenching the intermediate material formed with the above hole portion is carried out in a manner that the quenching is terminated at the point of time that the temperature at the portion corresponding to the depth to which the maximum shear stress affects is lowered to the MS point and then, the intermediate material is air cooled. Therefore, the interior of the material is martensitically transformed at its portion extended from its surface to the depth to which the maximum shear stress affects and hence, the bearing part can achieve the required surface hardness of HRC60 or more. In addition, the residual compressive stress occurring at the surface during the heat treatment is limited to 30 MPa or less, so that the failure such as cracks is prevented from developing in the peripheral area of the hole portion during the heat treatment.

DESCRIPTION OF THE PREFERRED EMBODIMENTS

A preferred embodiment of the present invention will hereinbelow be described with reference to the accompanying drawings.

A preferred embodiment illustrating a bearing part and a fabrication method therefor according to the present invention will be described as below with reference to the accompanying drawings. The following description is made by way of an example where the present invention is applied to an outer ring of a double-row tapered roller bearing.

Figure 1:
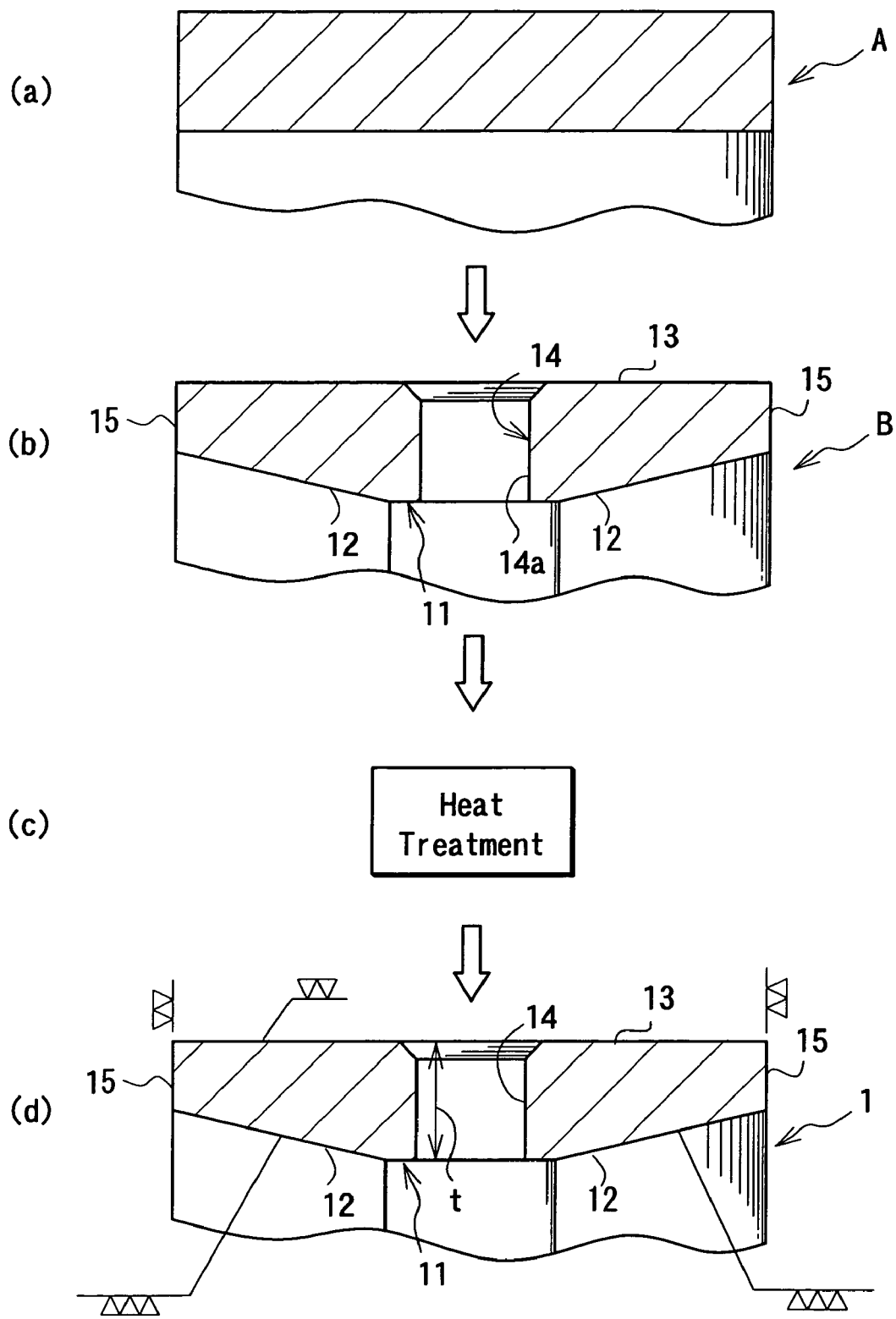
FIG. 1 is a diagram showing the steps of a fabrication method for bearing part according to one embodiment of the present invention.

FIG. 1 is a diagram showing the steps of a fabrication method for bearing part according to one embodiment of the present invention. According to the embodiment, an annular material A made of JIS SUJ2 as a bearing steel (see FIG. 1A) is firstly subjected to a turning process for working its outer peripheral surface 13 and end faces 15 into predetermined shapes as well as for forming an inner peripheral surface 11 axially centrally thereof. Furthermore, two tapered raceway surfaces 12 are formed on the inner peripheral surface 11 side in a manner to axially sandwich the inner peripheral surface 11 therebetween. Subsequently, a drill or the like is used to drill the above material A to form a through-hole radially extended through the material A (a vertical direction as seen in the figure) so as to intercommunicate the inner and outer peripheral surfaces 11, 13. Thus is formed a lubrication hole 14 (see FIG. 1B).

Subsequently, a blank (intermediate material) B thus subjected to the turning and drilling works is subjected to heating followed by quenching and then is tempered so that the surface of the blank may be hardened to a hardness of HRC60 or more (see FIG. 1C). In the heat treatment, residual compressive stress occurring in the surface of the blank B is limited to 30 MPa or less in order to prevent a peripheral area of the lubrication hole 14 from sustaining failure such as cracks or fractures. Specifically, the above blank B is heated to a predetermined temperature and then is quenched in a cooling oil bath. The quenching process is terminated at the point of time that a temperature at a portion of the blank B which corresponds to a depth from the above raceway surface 12, to which depth the maximum shear stress affects, or more specifically the temperature at the depth defined by a value (0.2t), which is given by multiplying the maximum width t (FIG. 1D) between the inner and outer peripheral surfaces 11, 13 of a completed product by a positive decimal fraction of 0.5 or less, for example 0.2, is lowered to an MS point (220–230° C.) at which martensitic transformation in the above SUJ2(material steel) starts. Then, the blank B is removed from the above oil bath and is cooled with air blow or allowed to cool. As a specific method for detecting when the blank has been cooled to the above-mentioned MS point, measurements may be made of the temperature at the aforementioned depth of a sample work with temperature sensing means such as a thermocouple attached thereto. Otherwise, a timer or the like may be used to take measurement of the cooling time so as to determine the temperature at the above depth on the analogy of data such as Gemini Curve.

In the heat treatment process wherein the blank B is heated and then guenched in the aforementioned manner, the residual compressive stress at the surface can be limited to 30 MPa or less by controlling the cooling temperature and speed. Thus is ensured that the above heat treatment does not encounter the propagation of the failure such as cracks from the peripheral area of the lubrication hole 14 opening into the inner and outer peripheral surfaces 11, 13 or from an inside wall 14a of the lubrication hole 14.

The blank B is cooled faster at the surface than at the depth defined by the above value 0.2t, so that the temperature at the surface reaches the MS point faster than the temperature at the above depth. Therefore, the degree of martensitic transformation of austenite progressively increases from the interior toward the surface of the blank B. As compared with the interior portion of the blank B, the surface portion of the blank B is adequately quench hardened and hence, a desired surface hardness of at least HRC60, which is required of the outer ring 1, is achieved.

After completion of the heat treatment, the blank B is subjected to the turning or polishing work for finishing the raceway surfaces 12, the outer peripheral surface 13 and the end faces 15 thereof to predetermined precisions (see FIG. 1D).

Figure 2:
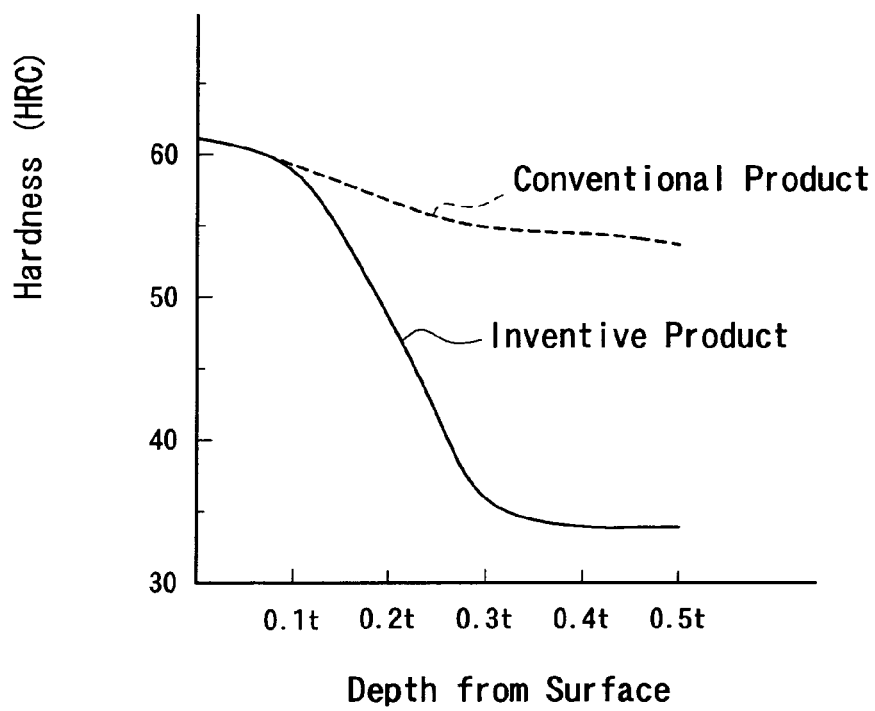
FIG. 2 is a graph representing the measurement results of hardness of a bearing part of FIG. 1 as determined at respective depths from its surface formed with a lubrication hole.
Figure 3:
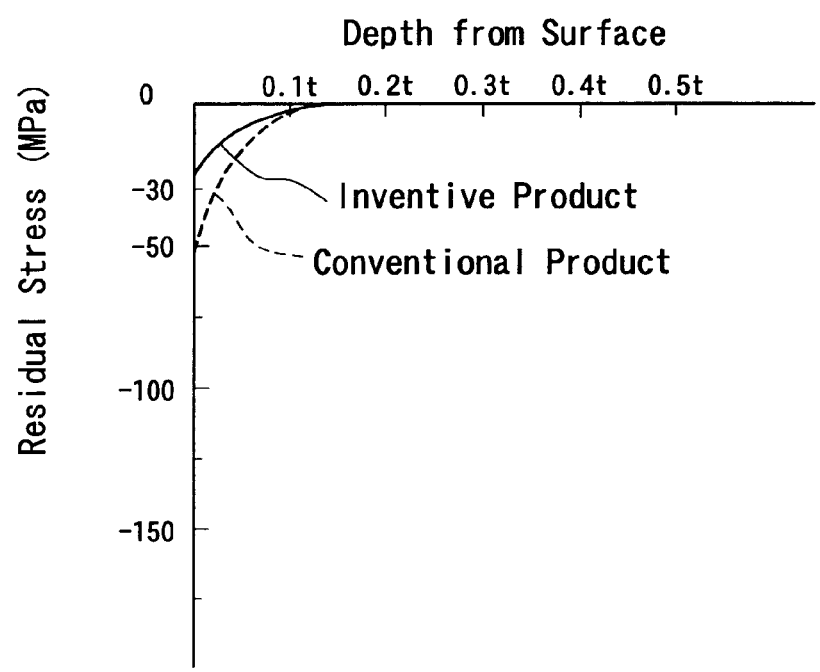
FIG. 3 is a graph representing the measurement results of residual compressive stress of the bearing part as determined at the respective depths from its surface formed with the lubrication hole.

Now referring to FIGS. 2 and 3, a specific description is made on a verification test conducted by inventors of the present invention.

The verification test was conducted as follows. The SUJ2 (inventive product) subjected to the above turning and drilling works, as shown in FIG. 1B, was heated at 840° C. for 1 hour and then immersed in a cooling oil for quenching. When the temperature at the depth defined by the value 0.2t was lowered to 220° C., the inventive product was removed from the oil bath and allowed to cool. Finally, the inventive product was obtained by polishing the inner and outer peripheral surfaces 11, 13, the raceway surfaces 12 and so on thereof. For the purpose of comparison, the measurement results of a conventional product are also referred to. In this conventional product, it was cooled in the oil until the temperature at the depth defined by the value 0.2t was lowered to 60° C.

As apparent from FIG. 2, the inventive product has achieved substantially the same surface hardness (HRC60 or more) at its surface portion as the conventional product. This demonstrates that the surface portion of the inventive product is fully martensitically transformed, thus attaining the increased hardness.

Furthermore, as shown in FIG. 3, the residual compressive stress at the surface of the inventive product is substantially decreased to half, as compared with 50 MPa at the surface of the conventional product. Thus, the residual compressive stress of the inventive product is limited to 30 MPa or less. In addition, some of the conventional products sustained failure such as cracks in a peripheral area of the lubrication hole. On the other hand, it was confirmed in the inventive product that the inside wall 14a of the lubrication hole 14 and the surfaces of the inner and outer peripheral surfaces 11, 13 and the raceway surfaces 12 were all free from the failure such as cracks.

Furthermore, since the hardness at a portion deeper than the depth (about 0.2t) affected by the maximum shear stress is at HRC50 or less, the bearing part as a whole has a sufficiently great toughness, so that a large size bearing part having an outside diameter of at least 300 mm and assembled in a steel rolling mill (machine) or the like may effectively be prevented from sustaining fracture.

If the residual compressive stress produced at the surface exceeds 30 MPa, a force applied to the lubrication hole is increased because of synergy between the great residual compressive stress and volume increase resulting from the austenite-to-martensite transformation associated with the temperature increase and hence, the fracture propagates from the peripheral area of the lubrication hole.

As described above, the outer ring (bearing part) 1 and the fabrication method therefor according to the embodiment are adapted to prevent the failures from occurring at the peripheral area of the lubrication hole 14 during the heat treatment, even though the lubrication hole 14 is formed prior to the heat treatment. As a consequence, an electro-discharge working for forming the lubrication hole 14 can be dispensed with and hence, the fabrication cost for the outer ring 1 is notably reduced. Furthermore, the outer ring 1 can achieve the surface hardness of HRC60 or more. Therefore, the outer ring 1, which is not reduced in service life, may be fabricated at low costs.

While the foregoing description has discussed the case where the present invention is applied to the outer ring 1 of the double-row tapered roller bearing, the present invention is applicable to various types of bearing parts including the hole opening into the surface thereof and at least having the surface hardened by the heat treatment. There is no limitation to the shape or use of the above hole, the type of the material steel, the contents of the heat treatment or the like. Specifically, the present invention may be applied not only to the bearing part including the aforementioned lubrication hole extended across the inner and outer peripheral surface 11 and 13 thereof but also to, for example, a bearing part formed with a bolt hole extended to a given depth from the outer peripheral surface 13 and threadedly engaging a hanging bolt for hanging a bearing, or a bearing part including a cut-away portion formed by cutting away the outer peripheral surface 13 to define a rectangular opening. Furthermore, the present invention is also applicable to a process for at least hardening the surface, the process including a case for subjecting another bearing steel (high-carbon chromium steel) such as JIS SUJ3 to the above heat treatment; a case for carburizing a case hardening (hardened) steel (low-carbon steel) such as SAE5120 or SCr420; a case for induction hardening a carbon steel for machine structural use such as S55C; and the like.

What is claimed is:

1. A bearing part having a hole portion opening into a surface thereof and hardened at least at said surface by a heat treatment, wherein
said surface has a hardness of HRC60 or more, and a residual compressive stress of said surface is made of 30 MPa or less in order to obviate failure in a peripheral area of the hole portion during heat treatment, wherein
said bearing part is an inner ring or an outer ring,
said bearing part is a large bearing part having an outside diameter of 300 mm or more, and
said hole portion is a lubrication hole formed so as to intercommunicate an inner peripheral surface and an outer peripheral surface of the bearing part.

2. A bearing part as claimed in claim 1, wherein said bearing part is a large bearing part for use in a steel rolling mill.

3. A fabrication method for the bearing part of claim 1, the method comprising a heat treatment step following a drill work for drilling a steel intermediate material thereby forming the hole portion opening into the surface thereof, wherein the intermediate material is heated to a predetermined temperature and then is quenched and wherein the quenching is terminated at the point of time that a temperature at a portion corresponding to a depth from the surface of said bearing part, to which depth the maximum shear stress affects, is lowered to an MS point at which martensitic transformation starts and then, the intermediate material is air cooled.

4. A fabrication method for the bearing part as claimed in claim 3, wherein provided that the maximum thickness of said bearing part is expressed as t, the quenching is carried out until the temperature at the portion corresponding to a depth of 0.5 t or less from the surface of the bearing part is lowered to said MS point.

5. A fabrication method for the bearing part as claimed in claim 3, wherein said MS point is in the range of 220 to 2300° C.

6. A bearing part having a hole portion opening into a surface thereof and hardened at least at said surface by a heat treatment, wherein
said surface has a hardness of HRC60 or more, and a residual compressive stress of said surface is made of 30 MPa or less in order to obviate failure in a peripheral area of the hole portion during heat treatment,
said bearing part is an inner ring or an outer ring,
said bearing part is a large bearing part having an outside diameter of 300 mm or more, and
said hole portion is a bolt hole opening into an inner peripheral surface or an outer peripheral surface of the bearing part.

7. A bearing part as claimed in claim 6, wherein said bearing part is a large bearing part for use in a steel rolling mill.

\* \* \* \* \*